United States Patent
Zeng et al.

(10) Patent No.: US 11,326,094 B2
(45) Date of Patent: May 10, 2022

(54) ELECTROCHROMIC FILM MATERIAL AND ELECTROCHROMIC FILM DEVICE PREPARED THEREFROM

(71) Applicant: SHENZHEN HUAKE-TEK CO., LTD., Shenzhen (CN)

(72) Inventors: Xiping Zeng, Shenzhen (CN); Gaili Yang, Shenzhen (CN)

(73) Assignee: SHENZHEN HUAKE-TEK CO., LTD., Shenzhen (CN)

( * ) Notice: Subject to any disclaimer, the term of this patent is extended or adjusted under 35 U.S.C. 154(b) by 0 days.

(21) Appl. No.: 17/040,049

(22) PCT Filed: Aug. 7, 2018

(86) PCT No.: PCT/CN2018/099137
§ 371 (c)(1),
(2) Date: Sep. 22, 2020

(87) PCT Pub. No.: WO2019/184182
PCT Pub. Date: Oct. 3, 2019

(65) Prior Publication Data
US 2021/0026213 A1 Jan. 28, 2021

(30) Foreign Application Priority Data
Mar. 27, 2018 (CN) .......................... 201810255791.0

(51) Int. Cl.
*G02F 1/161* (2006.01)
*G02F 1/1516* (2019.01)
*G02F 1/1524* (2019.01)
*C09K 9/02* (2006.01)
*B32B 17/10* (2006.01)

(52) U.S. Cl.
CPC .......... *C09K 9/02* (2013.01); *B32B 17/10513* (2013.01); *G02F 1/1524* (2019.01); *G02F 1/15165* (2019.01); *G02F 1/161* (2013.01); *G02F 2001/1517* (2013.01)

(58) Field of Classification Search
CPC .... G02F 1/161; G02F 1/1524; G02F 1/15165; G02F 2001/1517; C09K 9/02; B32B 17/10513
See application file for complete search history.

(56) References Cited

U.S. PATENT DOCUMENTS

| 2005/0231784 A1* | 10/2005 | Shinohara | B82Y 20/00 359/265 |
| 2010/0253994 A1* | 10/2010 | Cliff | C09K 9/02 359/273 |
| 2014/0144504 A1* | 5/2014 | Jang | H01G 9/2077 136/259 |
| 2015/0353819 A1* | 12/2015 | Vasiliev | C09K 9/02 252/583 |

FOREIGN PATENT DOCUMENTS

| CN | 101830090 A | 9/2010 |
| CN | 102803434 A | 11/2012 |
| CN | 102803434 A | 11/2012 |
| CN | 105907357 A | 8/2016 |

OTHER PUBLICATIONS

Written Opinion of the International Searching Authority dated Nov. 22, 2018 for the corresponding PCT international application.

* cited by examiner

*Primary Examiner* — Bijan Ahvazi

(57) ABSTRACT

The invention belongs to the technical field of electrochromic devices, particularly relates to a novel electrochromic film material, and further discloses an electrochromic film device prepared by the novel electrochromic film material. According to the electrochromic film device provided by the invention, the electrochromic film material is prepared by taking a high adhesive-property composition and a redox-type liquid-state electrochromic composition as raw materials for the first time, and the redox-type liquid-state electrochromic composition is dispersed and cured between conductive substrates by a curing reaction of the high adhesive-property composition. After a test, electrochromic response time of the electrochromic film device prepared by the invention is between 7-11 seconds, number of cycles is between 14-160,000 times, and color difference b value is between −20 and +30. It has a high color changing speed, long service life and stable performance, with a maximum cycle life reaching 160,000 times, and has good application performance.

3 Claims, No Drawings

ELECTROCHROMIC FILM MATERIAL AND ELECTROCHROMIC FILM DEVICE PREPARED THEREFROM

RELATED APPLICATIONS

This application is a United States National Stage Application filed under 35 U.S.C 371 of PCT Patent Application Serial No. PCT/CN2018/099137, filed Aug. 7, 2018, which claims Chinese Patent Application Serial No. CN 201810255791.0, filed Mar. 27, 2018, the disclosure of all of which are hereby incorporated by reference in their entirety.

The present disclosure is proposed on the basis of and claims the benefit of the Chinese Patent Application No. 201810255791.0, filed on Mar. 26, 2018, the entire contents of which are incorporated herein by reference.

TECHNICAL FIELD

The invention belongs to the technical field of electrochromic devices, particularly relates to a novel electrochromic film material, and further discloses an electrochromic film device prepared by the novel electrochromic film material.

BACKGROUND ART

Electrochromism is an electrically driven colour changing technology, which refers to a process of changing a material's own color by getting and losing electrons (redox) to cause a changed state under the action of an external power source. We refer to materials having such electrochromic properties as electrochromic materials, and refer to a device made using such electrochromic materials as an electro chromic device (ECD).

The ECD can change the color by transmitting and absorbing light, and the technology has wide application fields and development prospects, such as electrochromic windows, electrochromic display screens, electrochromic glasses and the like which have been developed in the prior art. When strong light is directly irradiated on the electrochromic window, the irradiation intensity of light can be changed by means of the switching effect of the color of the electrochromic window and partial infrared irradiation, the effect of adjusting indoor light and temperature is achieved, the energy consumption for heating, cooling and the like can be partially reduced, and the environmental pollution caused thereby is reduced; the electrochromic display screen is a display screen prepared by the electrochromic technology, and due to the memory effect of the electrochromic device that the electrochromic state function can be maintained once the electrochromic device does not need an external power supply, and an external voltage is not required when a static image is displayed, achieving the purpose of saving energy; and the electrochromic glasses are based on the electrochromic technology, break light control of a traditional product, can change color by changing voltage at any time and any place, and have great adjustability.

At present, enterprises mainly based on the electrochromic technology are Sage Glass, Gentex, E-control Glas, Gesimat in Germany and Chromo Genie in Sweden. However, since the performance of the existing electrochromic film device is not stable and the production process is complicated, the production cost is high, and the wide application and development of the electrochromic film device are limited.

SUMMARY OF THE INVENTION

Therefore, the technical problem to be solved by the present invention is to provide an electrochromic film material and further disclose an electrochromic film device prepared thereby.

In order to solve the technical problem, the invention discloses a high adhesive-property composition for preparing the electrochromic film material, which comprises the following components in parts by weight:
  1-60 parts by weight of a resin;
  0.01-50 parts by weight of a monomer;
  0.01-50 parts by weight of a crosslinking agent;
  0.001-5 parts by weight of an initiator; and
  0.001-0.01 parts by weight of a spacer.

The high adhesive-property composition for preparing the electrochromic film material comprises:
  the resin comprises an acrylate resin, a polyurethane resin, a polyester resin or an epoxy resin and other resins with double bonds easy to perform a free radical reaction; and preferably a polyurethane acrylate resin; and more specifically, it is selected from polyurethane acrylate resin CN704, polyurethane acrylate resin CN966J75NS, polyurethane acrylate resin UV65, and the like;
  the monomer comprises an acrylic monomer, an acrylate monomer, a vinyl monomer, an epoxy monomer or an epoxy acrylate monomer;
  the crosslinking agent comprises a polyfunctional functional monomer, such as difunctional crosslinking monomers, HDDA, BDDA, DEGDA, TEGDA, etc., or trifunctional crosslinking monomers, TMPTA, TEGDA, PETA, etc.;
  the initiator comprises a photoinitiator or a thermal initiator, including free radical initiators, such as photoinitiators I-1173, I-184, I-369, I-2959, I-819, EDB, ITX, TPO, or a thermal initiator AIBN, and preferably a system in which the photoinitiators are blended in two;
  the spacer comprises rigid microbeads, and preferably microbeads between 10 microns and 100 microns in diameter; the distance between two conductive substrates is controlled by the spacer, and the thickness of the electrochromic device can be adjusted by adding the spacers of different diameters, specifically 10 micrometers, 20 micrometers, 30 micrometers, 50 micrometers, 100 micrometers.

The invention also discloses a redox-type liquid-state electrochromic composition for preparing the electrochromic film material, which comprises the following components in parts by weight:
  0.01-10 parts by weight of an electrochromic material;
  0.01-10 parts by weight of an ion storage material;
  50.01-102.5 parts by weight of a liquid electrolyte material.

The redox-type liquid-state electrochromic composition for preparing the electrochromic film material comprises:
  the electrochromic material comprises an electrochromic material such as an organic high molecule, an organic small molecule, and a metal oxide or metal complex;
  among them, the organic high molecule electrochromic material is at least one selected from polythiophene, polypyrrole, polyaniline, high-molecular polymers with electrochromic structures on side chains, and high-molecular metal complexes; the organic small-molecular electrochromic material is specifically selected from one of viologen compounds, triphenylamine, triphenylamine derivatives, carbazole, carbazole derivatives, anthraquinone, anthraquinone derivatives, phenothiazine, phenothiazine derivatives and the like; the metal oxide electrochromic material is mainly a transition metal oxide and is specifically selected from one of vanadium pentoxide, tungsten oxide, cerium oxide, indium tin oxide and the like; and the metal complex is specifically selected from one of Prussian blue, Prussian black, Prussian white, Prussian green, nitrosyl oxygen-containing molybdenum complexes and the like;

the ion storage material comprises a compound such as vanadium pentoxide, tungsten oxide, cerium oxide, indium tin oxide, Prussian blue, polyaniline, triphenylamine, phenazine or viologen;

the liquid electrolyte material consists of 50-99 parts by weight of a liquid conductive medium and 0.1-3.5 parts by weight of an electrolyte salt;

the liquid conductive medium comprises a liquid organic solvent, an ionic liquid or a gel-like crosslinked polymer material, such as propylene carbonate, ethylene glycol carbonate, etc.;

the electrolyte salt is selected from at least one of lithium perchlorate, lithium hexafluorophosphate, lithium tetrafluorophosphate, lithium bis(oxalate)borate, lithium diimine, and lithium bis(trifluoromethylsulfonyl)imide.

The invention also discloses a use of the high adhesive-property composition for preparing the electrochromic film material.

The invention also discloses a use of the redox-type liquid-state electrochromic composition for preparing the electrochromic film material.

The invention also discloses an electrochromic film material, wherein its raw material components comprise a high adhesive-property composition and a redox-type liquid-state electrochromic composition, and the mass ratio of the high adhesive-property composition to the redox-type liquid-state electrochromic composition is 1:0.01-50.

The invention also discloses a method for preparing the electrochromic film material, which comprises uniformly mixing the components of the high adhesive-property composition and the redox-type liquid-state electrochromic composition according to a selected amount, and curing to obtain the electrochromic film material.

In the step of curing reaction, if a photoinitiator is used, the curing reaction condition is ultraviolet light, the energy of the light is 0.5 mW/cm$^2$-5.5 mW/cm$^2$, more preferably 2.5 mW/cm$^2$, and the curing time is 30 s-5 min, more preferably 2 min; if a thermal initiator is used, the curing reaction condition is oven heating, wherein the heating temperature is 30-80° C., more preferably 55° C., and the curing time is 10 s-30 min, more preferably 10 min.

The invention also discloses an electrochromic film device comprising two layers of conductive substrates and the electrochromic film material cured between the two layers of conductive substrates.

The conductive substrate comprises an indium tin oxide (ITO) conductive glass, an indium tin oxide (ITO) conductive film, a silver nanowire conductive film, a fluorinated doped tin oxide glass, or a polymer conductive film.

The invention also discloses a method for preparing the electrochromic film device, comprising uniformly mixing the components of the high adhesive-property composition and the redox-type liquid-state electrochromic composition according to a selected amount, coating the obtained mixture between the selected two layers of conductive substrates, and carrying out a curing reaction to obtain a required electrochromic film device.

In the step of curing reaction, if a photoinitiator is used, the curing reaction condition is ultraviolet light, the energy of the light is 0.5 mW/cm$^2$-5.5 mW/cm$^2$, more preferably 2.5 mW/cm$^2$, and the curing time is 30 s-5 min, more preferably 2 min; if a thermal initiator is used, the curing reaction condition is oven heating, wherein the heating temperature is 30-80° C., more preferably 55° C., and the curing time is 10 s-30 min, more preferably 10 min.

According to the electrochromic film device disclosed by the invention, the electrochromic film material is prepared by taking a high adhesive-property composition and an electrochromic composition as raw materials for the first time, and the electrochromic composition is dispersed and cured between the conductive substrates by a curing reaction of the high adhesive-property composition. After a test, electrochromic response time of the electrochromic film device prepared by the invention is 7-11 seconds, and number of cycles is 14-160,000 times, and color difference b value is between −20 and +30. It has a high color change speed, long service life and stable performance, with a maximum cycle life reaching 160,000 times, and has good application performance.

According to the electrochromic film device disclosed by the invention, the production process is simple, the light transmittance of an original conductive base material is basically not changed before and after the curing, and the light transmittance of the electrochromic film device is over 80, which can meet the requirements of a user on chromaticity and light transmittance adjustment. Meanwhile, compared with an existing light regulating device on the market, the device provided by the invention has the advantages that the technology of dispersing and fixing an electrochromic solution by using the high adhesive-property composition effectively reduces the production cost, and has good economic benefit.

DETAILED DESCRIPTION OF THE INVENTION

Test conditions and methods for the performance of the obtained electrochromic film device in the following embodiments of the invention specifically comprise:

electrochromic properties: ultraviolet-visible-spectrophotometer (Jesco-V670) supplied by Japan Spectrometer Co., Ltd;

chromaticity change of the electrochromic device in different states: Philips 15-4460 colorimeter;

number of cycles: the cycling of the electrochromic device is realized by utilizing a multi-potential step method, and the cycling process of the electrochromic device is monitored in real time by combining V-670 so as to test the working performance of the electrochromic device;

driving voltage: CHI-660D electrochemical analyzer supplied by Shanghai Chenhua Instrument Co., Ltd.

EMBODIMENT 1

The electrochromic film device of the embodiment comprises two layers of indium tin oxide (ITO) conductive films as conductive substrates, wherein electrochromic film material is dispersed and cured between the two layers of ITO conductive films.

According to the embodiment, the electrochromic film material comprises a high adhesive-property composition and a redox-type liquid-state electrochromic composition, and the electrochromic film material specifically comprises the following raw materials:

10 kg of polyurethane acrylate resin;
10 kg of methacrylate monomer;
3 kg of trifunctional crosslinking agent PETA;
0.003 kg of photoinitiator TPO;

0.003 kg of 10 μm spacer;
1 kg of triphenylamine;
1 kg of Prussian blue;
74 kg of propylene carbonate; and
0.5 kg of lithium perchlorate.

The preparation method of the electrochromic film device in the embodiment comprises taking each raw material component according to a selected amount, uniformly mixing the raw material components, coating the raw material components between two pieces of indium tin oxide (ITO) conductive films with a length of 3 meters and a width of 3 meters by using a roller coater, and curing for 2 minutes by using ultraviolet light with the energy of 2.5 mW/cm$^2$ to obtain an electrochromic film device 1.

The resulting device was connected to a DC voltage of 5 V, the device turned yellow green from blue, the response time was 11 seconds, the light transmittance of the device was changed from 84.4 to 84.3, the color difference b value was changed from −20 to +30, and the number of cycles was 151154.

EMBODIMENT 2

The electrochromic film device of the embodiment comprises two layers of indium tin oxide (ITO) conductive films as conductive substrates, wherein electrochromic film material is dispersed and cured between the two layers of ITO conductive films.

According to the embodiment, the electrochromic film material comprises a high adhesive-property composition and a redox-type liquid-state electrochromic composition, and the electrochromic film material specifically comprises the following raw materials:
    10 kg of polyurethane acrylate resin;
    8 kg of epoxy acrylate;
    3 kg of trifunctional crosslinking agent TMPTA;
    0.003 kg of photoinitiator TPO;
    0.003 kg of 10 μm spacer;
    3 kg of polythiophene
    1 kg of Prussian blue;
    74 kg of propylene carbonate; and
    0.5 kg of lithium perchlorate.

The preparation method of the electrochromic film device in the embodiment comprises taking each raw material component according to a selected amount, uniformly mixing the raw material components, coating the raw material components between two pieces of indium tin oxide (ITO) conductive films with a length of 3 meters and a width of 3 meters by using a roller coater, and curing for 3 minutes by using ultraviolet light with the energy of 2.5 mW/cm$^2$ to obtain an electrochromic film device 2.

The resulting device was connected to a DC voltage of 5.5 V, the device turned yellow green from blue, the response time was 10 seconds, the light transmittance of the device was changed from 84.4 to 84.1, the color difference b value was changed from −20 to +20, and the number of cycles was 148958.

EMBODIMENT 3

The electrochromic film device of the embodiment comprises two layers of indium tin oxide (ITO) conductive films as conductive substrates, wherein electrochromic film material is dispersed and cured between the two layers of ITO conductive films.

According to the embodiment, the electrochromic film material comprises a high adhesive-property composition and a redox-type liquid-state electrochromic composition, and the electrochromic film material specifically comprises the following raw materials:
    10 kg of polyurethane acrylate resin;
    8 kg of epoxy acrylate;
    3 kg of trifunctional crosslinking agent TMPTA;
    0.003 kg of thermal initiator;
    0.003 kg of 10 μm spacer;
    3 kg of polypyrrole;
    1 kg of Prussian blue;
    74 kg of propylene carbonate; and
    0.5 kg of lithium perchlorate.

The preparation method of the electrochromic film device in the embodiment comprises the following steps: and taking the raw material components according to a selected amount, uniformly mixing the raw material components, coating the raw material components between two pieces of indium tin oxide (ITO) conductive films with a length of 3 meters and a width of 3 meters by using a roller coater, and curing at 60° C. for 5 minutes by using an oven to obtain an electrochromic film device 3.

The resulting device was connected to a DC voltage of 5.5 V, the device turned yellow green from blue, the response time was 8 seconds, the light transmittance of the device was changed from 84.4 to 81.5, the color difference b value was changed from −18 to +11, and the number of cycles was 144650.

EMBODIMENT 4

The electrochromic film device of the embodiment comprises two layers of silver nanowire conductive films as conductive substrates, wherein electrochromic film material is dispersed and cured between the two layers of silver nanowire conductive films.

According to the embodiment, the electrochromic film material comprises a high adhesive-property composition and a redox-type liquid-state electrochromic composition, and the electrochromic film material specifically comprises the following raw materials:
    10 kg of polyurethane acrylate resin;
    8 kg of epoxy acrylate;
    3 kg of trifunctional crosslinking agent TMPTA;
    0.003 kg of thermal initiator;
    0.003 kg of 10 μm spacer;
    3 kg of polypyrrole;
    1 kg of ferrocene;
    95 kg of ethylene glycol carbonate; and
    0.5 kg of lithium perchlorate.

The preparation method of the electrochromic film device in the embodiment comprises taking the raw material components according to a selected amount, uniformly mixing the raw material components, coating the raw material components between two pieces of silver nanowire conductive films with a length of 3 meters and a width of 3 meters by using a roller coater, and curing for 5 minutes at 60° C. by using an oven to obtain an electrochromic film device 4.

The device was connected to a DC voltage of 5.0 V, the device turned yellow green from blue, the response time was 9 seconds, the light transmittance of the device was changed from 84.6 to 82.9, the color difference b value was changed from −17 to +11, and the number of cycles was 144920.

EMBODIMENT 5

The electrochromic film device comprises two layers of fluorinated doped tin oxide glasses as conductive substrates, and the electrochromic film material is dispersed and cured between the two layers of fluorinated doped tin oxide glasses.

According to the embodiment, the electrochromic film material comprises a high adhesive-property composition and a redox-type liquid-state electrochromic composition, and the electrochromic film material specifically comprises the following raw materials:

1 kg of epoxy resin;
0.01 kg of epoxy acrylate monomer;
0.01 kg of difunctional crosslinking monomer HDDA;
0.001 kg of photoinitiator EDB;
0.001 kg of 20 μm spacer;
0.01 kg of polyaniline;
0.01 kg of vanadium pentoxide;
50 kg of ethylene glycol carbonate; and
0.1 kg of lithium hexafluorophosphate.

The electrochromic film device described in this embodiment is prepared in the same method as in Embodiment 1.

EMBODIMENT 6

The electrochromic film device of the embodiment comprises two layers of indium tin oxide (ITO) conductive films as conductive substrates, wherein electrochromic film material is dispersed and cured between the two layers of ITO conductive films.

According to the embodiment, the electrochromic film material comprises a high adhesive-property composition and a redox-type liquid-state electrochromic composition, and the electrochromic film material specifically comprises the following raw materials:

60 kg of polyurethane acrylate resin CN966J75NS;
50 kg of vinyl monomer;
50 kg of difunctional crosslinking monomer TEGDA;
5 kg of thermal initiator AIBN;
0.01 kg of 30 μm spacer;
10 kg of phenothiazine;
10 kg of polyaniline;
99 kg of propylene carbonate; and
3.5 kg of lithium bis(oxalate)borate.

The electrochromic film device described in this embodiment is prepared in the same method as in Embodiment 3.

According to the test data, the electrochromic response time of the electrochromic film device provided by the invention is 7-11 seconds, the number of cycles is 14-160,000 times, the color difference b value is −20 to +30, and the electrochromic film device has good performance.

According to the electrochromic film device disclosed by the invention, the production process is simple, the light transmittance of an original conductive base material is basically not changed before and after the curing, and the light transmittance of the electrochromic film device is over 80, which can meet the requirements of a user on chromaticity and light transmittance adjustment. Meanwhile, compared with an existing light regulating device on the market, the device provided by the invention has the advantages that the technology of dispersing and fixing an electrochromic solution by using the high adhesive-property composition effectively reduces the production cost, and has good economic benefit.

It is obvious that the above-described embodiments are merely illustrative for clarity of description and are not restrictive of the embodiments. For those skilled in the art, other variations and modifications in different forms can be made on the basis of the above description. All implementations are not required to be exhaustive. However, obvious changes and alterations derived therefrom are still within the scope of the invention.

The invention claimed is:

1. An electrochromic film material, comprising a high adhesive-property composition and a redox-type liquid-state electrochromic composition, and the mass ratio of the high adhesive-property composition to the redox-type liquid-state electrochromic composition is 1:0.01-50;
   the high adhesive-property composition comprises following components in parts by weight:
   1-60 parts by weight of a resin to weight of the high adhesive-property composition, wherein the resin comprises an acrylate resin, a polyurethane resin, a polyester resin or an epoxy resin:
   0.01-50 parts by weight of a monomer to weight of the high adhesive-property composition, wherein the monomer comprises an acrylic monomer, an acrylate monomer, a vinyl monomer, an epoxy monomer or an epoxy acrylate monomer;
   0.01-50 parts by weight of a crosslinking agent to weight of the high adhesive-property composition, wherein the crosslinking agent comprises a polyfunctional functional monomer;
   0.001-5 parts by weight of an initiator to weight of the high adhesive-property composition, wherein the initiator comprises a photo initiator or a thermal initiator, and
   0.001-0.01 parts by weight of a spacer to weight of the high adhesive-property composition, wherein the spacer comprises rigid microbeads between 10 microns to 100 microns in diameter to control the distance between two conductive substances;
   the redox-type liquid-state electrochromic composition comprises the following components in parts by weight,
   0.01-10 parts by weight of an electrochromic material to weight of the redox-type liquid-state electrochromic composition, wherein the electrochromic material comprises an electrochromic material a high organic molecule, small organic molecule, and a metal oxide or metal complex;
   0.01-10 parts by weight of an ion storage material to weight of the redox-type liquid-state electrochromic composition, wherein the ion storage material comprises a compound selected from the group consisting of vanadium pentoxide, tungsten oxide, cerium oxide, indium tin oxide, Prussian blue, polyaniline, triphenylamine, phenazine and viologen;
   50.01-102.5 parts by weight of a liquid electrolyte material to weight of the redox-type liquid-state electrochromic composition, wherein the liquid electrolyte material consists of 50-99 parts by weight of a liquid conductive medium to weight of the liquid electrolyte material and 0.1-3.5 parts by weight of an electrolyte salt to weight of the liquid electrolyte material;
   the liquid conductive medium comprises a liquid organic solvent, an ionic liquid or a gel-like crosslinked polymer material;
   the electrolyte salt is selected from at least one of lithium perchlorate, lithium hexafluorophosphate, lithium tetrafluorophosphate, lithium bis(oxalate)borate, lithium diimine, and lithium bis(trifluoromethylsulfonyl)imide;
   the high organic molecule electrochromic material is selected from at least one of polythiophene, polypyrrole, and polyaniline;

the small organic molecule electrochromic material is selected from one of viologen compounds, triphenylamine, triphenylamine derivatives, carbazole, carbazole derivatives, anthraquinone, anthraquinone derivatives, phenothiazine and phenothiazine derivatives;

the metal oxide electrochromic material is a transition metal oxide selected from vanadium pentoxide, tungsten oxide, cerium oxide and indium tin oxide; and the metal complex is selected from one of Prussian blue, Prussian black, Prussian white, Prussian green, and nitrosyl oxygen-containing molybdenum complexes.

2. An electrochromic film device, comprising two layers of conductive substrates, and the electrochromic film material according to claim 1, wherein the electrochromic film material is cured between the two layers of conductive substrates.

3. The electrochromic film device according to claim 2, wherein the conductive substrate comprises an indium tin oxide conductive glass, an indium tin oxide conductive film, a silver nanowire conductive film, a fluorinated doped tin oxide glass, or a polymer conductive film.

* * * * *